United States Patent
Sanders et al.

(10) Patent No.: US 12,271,307 B2
(45) Date of Patent: Apr. 8, 2025

(54) MAINTAINING CACHE VALIDITY

(71) Applicant: INTERNATIONAL BUSINESS MACHINES CORPORATION, Armonk, NY (US)

(72) Inventors: Lee Jason Sanders, Chichester (GB); Ben Sasson, North Baddesley (GB); Roderick Guy Charles Moore, Bournemouth (GB); Paul Nicholas Cashman, Alton (GB)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 18/182,648

(22) Filed: Mar. 13, 2023

(65) Prior Publication Data

US 2024/0256447 A1    Aug. 1, 2024

(30) Foreign Application Priority Data

Feb. 1, 2023 (GB) .................................... 2301426

(51) Int. Cl.
*G06F 12/0802* (2016.01)
*G06F 12/121* (2016.01)

(52) U.S. Cl.
CPC ........ *G06F 12/0802* (2013.01); *G06F 12/121* (2013.01); *G06F 2212/45* (2013.01)

(58) Field of Classification Search
CPC . G06F 12/0802; G06F 12/121; G06F 2212/45
See application file for complete search history.

(56) References Cited

U.S. PATENT DOCUMENTS

| | | | |
|---|---|---|---|
| 6,996,676 B2 | 2/2006 | Megiddo | |
| 9,880,739 B2* | 1/2018 | Agombar | G06F 3/0659 |
| 10,592,527 B1* | 3/2020 | Jia | G06F 16/27 |
| 2016/0357674 A1 | 12/2016 | Waldspurger | |
| 2018/0314646 A1 | 11/2018 | Xu | |
| 2019/0034286 A1* | 1/2019 | Brown | G06F 3/0619 |
| 2019/0138453 A1* | 5/2019 | Bennett | G06F 12/10 |
| 2021/0286552 A1 | 9/2021 | Shen | |
| 2022/0224776 A1 | 7/2022 | Doshi | |

FOREIGN PATENT DOCUMENTS

CN    104035887 A    9/2014

OTHER PUBLICATIONS

Sanders, et al., "Maintaining Cache Validity," Application and Drawings, Filed on Feb. 1, 2023, 33 Pages, Related GB Patent Application Serial No. 2301426.9.
Intellectual Property Office, "Patents Act 1977: Search Report under Section 17(5)," Intellectual Property Office, Jul. 18, 2023, 3 pages, GB Application No. 2301426.9.

* cited by examiner

*Primary Examiner* — Baboucarr Faal
(74) *Attorney, Agent, or Firm* — Teddi E. Maranzano (57) ABSTRACT

A method, system, computer program product and computer program for managing a storage system, the storage system comprising a first storage device, a second storage device, a source storage device, a target storage device, and a cache, the method comprising: receiving a first host access request for a data block on the first storage device; receiving a mapping between the source storage device and the target storage device; and in response to the first host access request and the mapping: accessing a corresponding data block on the second storage device; and updating metadata for the cache.

20 Claims, 8 Drawing Sheets

MAINTAINING CACHE VALIDITY

TECHNICAL FIELD

The invention is generally directed to storage, and more particularly to a method, system, and computer program product suitable for managing a storage array in a storage system.

BACKGROUND ART

Modern storage systems have access to more than one cache algorithm. While traditional caching uses LRU, some modern, more efficient, implementations are using, for example, Adaptive Replacement Cache (ARC) or other algorithms that take frequency and usefulness into account to reduce the chances of a non-intentionally cache-hostile I/O workload impacting overall system performance.

A cache algorithm maintains entries in a cache. When a cache is full the algorithm decides which entry should be deleted. One popular algorithm is Least Recently Used (LRU), which deletes the least recently used items first. This algorithm requires keeping track of what was used when. An ordered list is kept of resource entries in the cache, the order based on the time of the most recent access. New entries enter at the top once the bottom entry has been removed. If an entry already exists in the cache (a cache "hit"), that entry moves to the top.

In contrast, Least Frequently Used (LFU) counts how often an item is needed. The item least often used is discarded first.

U.S. Pat. No. 6,996,676 B2 Megiddo, N. et al ("System and Method for Implementing an Adaptive Replacement Cache Policy", Feb. 7, 2006) discloses an adaptive replacement cache policy which dynamically maintains two lists of pages, a recency list and a frequency list, in addition to a cache directory. The policy keeps these two lists to roughly the same size, the cache size c. Together, the two lists remember twice the number of pages that would fit in the cache. At any time, the policy selects a variable number of the most recent pages to exclude from the two lists. The policy adaptively decides in response to and evolving workload how many top pages from each list to maintain in the cache at any given time. It achieves such online, on-the-fly adaptation by using a learning rule that allows the policy to track a workload quickly and effectively. This allows the policy to balance between recency and frequency in an online and self-tuning fashion, in response to evolving and possibly changing access patterns. It allows one-time-only sequential read requests to pass through the cache without flushing pages that have temporal locality. The policy is extremely simple to implement and requires only constant-time overhead per request. The policy has negligible space overhead. In an Adaptive Replacement Cache (ARC) both frequently used and recently used pages plus a recent eviction history for both are recorded. The IBM® DS8000® storage controller uses ARC.

IBM Remote mirror and copy is a storage feature that constantly updates a target copy of a volume so that it matches changes that were made to its associated source volume. IBM Remote mirror and copy does not capture the state of the source volume at some point in time, but rather reflects all changes that were made on the source volume to the target volume.

IBM Global Copy provides an asynchronous long-distance copy option where write operations to a storage unit at a production site are considered complete before they are transmitted to a storage unit at your recovery site. IBM Metro Mirror functions provides a synchronous long-distance copy option that constantly updates a secondary copy of a volume to match changes made to a source volume. Writes to the production site are only considered complete when transmitted to a storage unit at your recovery site.

Point-in-time copy is a feature supported on various storage devices that allows nearly instantaneous point in-time copies of entire logical volumes or data sets to be made. The point-in-time function allows full volume copies of data to be made, with the copies immediately available for read or write access. The copy may be used with standard backup tools that are available in a computing environment to create backup copies on tape.

"Snapshot" provides the ability to record the state of a storage device at any given moment and preserve that snapshot as a guide for restoring the storage device in the event that it fails. A snapshot primarily creates a point-in time copy of the data. Typically, a snapshot copy function is done instantly and made available for use by other applications such as data protection, data analysis and reporting and data replication applications. The original copy of the data continues to be available to the applications without interruption, while the snapshot copy is used to perform other functions on the data. A snapshot is a point-in-time copy that is dependent on the primary disk. A snapshot may, for example, be accomplished using a copy-on-write procedure, in which currently existing data in a region on the primary disk is written to the backup disk when a write is being made to the region on the primary disk. Thus, the backup disk will contain data that has been overwritten on the primary disk, as opposed to a complete copy of the primary disk. This type of backup copy typically results in a thinly provisioned volume, which reduces storage. A series of snapshot copies may be cascaded together to represent the primary disk at various times. However, the snapshot copies typically remain dependent on the primary disk to reassemble a complete copy of the primary disk. Therefore, a snapshot is a point-in-time copy where the target only holds the changed data necessary to present the point-in-time copy of the source. Data is only copied to the target disk if it is changed on the source. The target disk is generally always dependent on some of the data on the source disk in order to present the point-in-time copy.

In contrast, a "clone" is a point-in-time copy that is independent of the primary disk. A clone may, for instance, be created by executing a background copy procedure in which a disk's regions are sequentially copied to the backup disk and executing a copy-on-write procedure to immediately copy any primary disk regions that are about to be overwritten due to a write and have not yet been processed by the background copy procedure. A clone is typically used when a copy is needed and input/output (I/O) to the copy must not impact I/O to the primary volume in any way. A clone may also be used when the copy is not to be affected by availability to the source. A clone may also be used in a cascade. Therefore, a clone is a point-in-time copy where the target disk will hold a complete copy of the data that was on the source disk when the point-in-time copy was started. When the copying of the data from source to target completes, the target disk is independent of the source.

Point-in-time copies are made using a bitmap to keep track of data grains copied over from a source disk to a target disk. When data is copied between a source and a target, the data is copied in chunks known as "grains." Grain size is determined at the time of mapping creation. Typical sizes are 256 KB and 64 KB. Data grains are copied using a background copy process. In the event of a read of a data grain to the target drive before the data grain has been copied over the target, the read is redirected to the source drive. In the event of a read of a data grain to the target drive after the data grain has been copied over the target, the read is directed to the target drive. In the event of a write of a data grain to the target drive before the data grain has been copied over the target, the corresponding entry in the bitmap is marked as complete. In the event of a write of a data grain to the target drive after the data grain has been copied over the target, the write is directed to the target drive. In the event of a write of a data grain to the source drive before the data grain has been copied over the target, the data grain is first copied to the target drive before the source disk data grain is overwritten with new data. In this way the source and target drives are presented to the host as being instantaneously available, even before all data has actually been copied over to the target drive.

Deduplication methods can be based on hashing the data written to identify matches to data ranges previously written by matching the hash value to that stored in metadata (commonly the hashes are stored in the form of a Log Structured Array). Rather than consuming more media on the storage device by performing a write to the media the device's metadata can be updated to increase the reference count for the data hash and achieve deduplication space savings.

As with other storage technologies like compression and encryption, deduplication technologies can be introduced into flash disks and consumed by a RAID layer that composes the disks into an array with a specific RAID level to improve reliability and or performance. RAID arrays are built using disks with the same storage characteristics and so it is possible to conceive of the disk specification for an array (for example the Field Replaceable Unit (FRU) replacement specification etc.) to include the specification of the deduplication hash method running on the disks. This common disk duplication hash environment generates new opportunities for the RAID layer to improve reliability.

In an enterprise storage system, the same data can often be stored in multiple places. In RAID 1, such duplication is intentional so as to provide data redundancy. However, in some cases, duplication is unintentional leading to inefficient use of physical disks.

In some systems, duplicate data can be removed with a deduplicate operation. In computer science, 'deduplication' is the elimination of duplicate or redundant information. Deduplication comprises deleting duplicate data. Pointers and references also need updating to reference to the remaining data instance. In RAID systems, the identification of duplicate data and the updating of references are especially difficult, because the nature of RAID inherently applies a layer of abstraction to the location of a particular data block.

Conversely, when improved data integrity is desired, there is a need to identify data regions that display a single point of failure.

The combination of copy-on-write, which is a common approach for implementing point in time copies, and frequency based caching introduces an undesired effect in which the wrong access frequency characteristics are assigned to both the copied data and new data. Deduplication and associated access to data can also lead to discrepancies in the associated access frequency data.

Therefore, there is a need in the art to address the aforementioned problem.

SUMMARY OF THE INVENTION

According to the present invention there are provided a method, a system, and a computer program product according to the independent claims.

Viewed from a first aspect, the present invention provides a computer implemented method for managing a storage system, the storage system comprising a first storage device, a second storage device, a source storage device, a target storage device, and a cache, the method comprising: receiving a first host access request for a data block on the first storage device; receiving a mapping between the source storage device and the target storage device; and in response to the first host access request and the mapping: accessing a corresponding data block on the second storage device; and updating metadata for the cache.

Viewed from a further aspect, the present invention provides a system for managing a storage array in a storage system, the storage system comprising a first storage device, a second storage device, a source storage device, a target storage device, and a cache, the system comprising: a receive component for receiving a first host access request for a data block on the first storage device; the receive component for receiving a mapping between the source storage device and the target storage device; and responsive to the first host access request and the mapping: a data read/write component for accessing a corresponding data block on the second storage device; and a metadata update component for updating metadata for the cache.

Viewed from a further aspect, the present invention provides a system for managing a storage array in a storage system.

Viewed from a further aspect, the present invention provides a computer program product for managing a storage system, the computer program product comprising a computer readable storage medium readable by a processing circuit and storing instructions for execution by the processing circuit for performing a method for performing the steps of the invention.

Viewed from a further aspect, the present invention provides a computer program stored on a computer readable medium and loadable into the internal memory of a digital computer, comprising software code portions, when said program is run on a computer, for performing the steps of the invention.

Preferably, the present invention provides a method, system, computer program product and computer program, wherein the mapping indicates that the data block on the first storage device has not been copied to a corresponding data block on the second storage device, the invention further comprising: in response to the first host access request comprising a read request for the data block on the target storage device and to the mapping: accessing the corresponding data block on the second storage device comprises reading the corresponding data block on the source storage device; and updating metadata comprises updating metadata for the target storage device.

Preferably, the present invention provides a method, system, computer program product and computer program, wherein: the mapping indicates that the data block on the first storage device has not been copied to a corresponding data block on the second storage device, the method further comprising: in response to the first host access request comprising a write request for the data block on the source storage device and the mapping: accessing the corresponding data block on the second storage device comprises writing the data block to the source storage device; and updating metadata comprises updating metadata for the source storage device.

Preferably, the present invention provides a method, system, computer program product and computer program, wherein: further comprising: accessing the corresponding data block on the second storage device further comprises copying a second data block from the source storage device to a second corresponding data block on the target storage device prior to writing the data block to the source storage device; and updating metadata further comprises updating the mapping to indicate that the data block on the first storage device has been copied to a corresponding data block on the second storage device.

Preferably, the present invention provides a method, system, computer program product and computer program, wherein: the mapping indicates that the data block on the first storage device has not been copied to a corresponding data block on the second storage device, the method further comprising: in response to the first host access request comprising a write request for the data block on the target storage device and the mapping: accessing the corresponding data block on the second storage device comprises writing the data block on the target storage device; and writing the data block to the source storage device; and updating metadata comprises updating metadata for the source storage device and updating the mapping to indicate that the data block on the first storage device has been copied to a corresponding data block on the second storage device.

Preferably, the present invention provides a method, system, computer program product and computer program, wherein: the target storage device comprises a point in time copy of the source storage device.

Preferably, the present invention provides a method, system, computer program product and computer program, wherein: wherein the target storage device comprises a deduplication record of the source storage device.

Preferably, the present invention provides a method, system, computer program product and computer program, wherein: wherein the source storage device and the target storage device are members of a mirroring RAID array.

Advantageously, the invention allows for a way of retaining the correct frequency statistics such that overall performance and cache behaviour remain the same.

Advantageously, the optimization of correct frequency based caching of workloads is preserved by applying access stream heat maps to cache access frequency data when a grain is modified.

BRIEF DESCRIPTION OF THE DRAWINGS

The present invention will now be described, by way of example only, with reference to preferred embodiments, as illustrated in the following figures.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
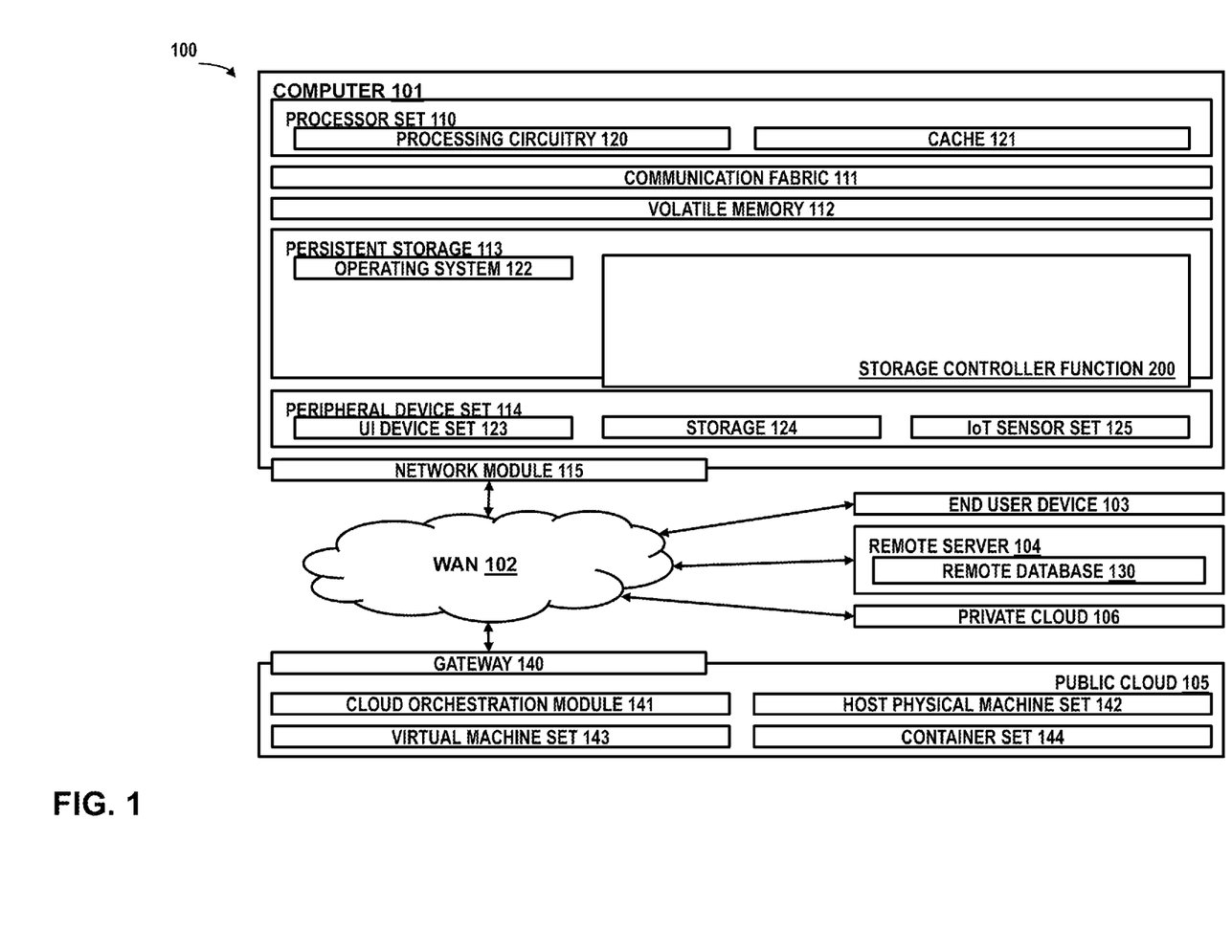
FIG. 1 depicts a computing environment 100, according to an embodiment of the present invention.

FIG. 1 depicts a computing environment 100. Computing environment 100 contains an example of an environment for the execution of at least some of the computer code involved in performing the inventive methods, such as software functionality 200 for an improved storage controller 512. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard disk, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

A logical unit number (LUN) is a unique identifier for identifying a collection of physical or logical storage. A LUN can reference a single disk, a partition of disks, or an entire RAID array. Logical block addressing (LBA) is a method for specifying a location of blocks of data on storage devices.

Small Computer System Interface (SCSI) a set of command set standards for physically connecting and transferring data between computers and peripheral devices, such as disks. SCSI is available in a number of interfaces, for example, SSA, 1 Gbit Fibre Channel (1GFC), SAS. SCSI can be parallel or serial. The skilled person would understand that there are other command sets and interfaces. Another example is NVM Express (NVMe) or Non-Volatile Memory Host Controller Interface Specification (NVMH-CIS), which is an interface specification for accessing a computer's non-volatile storage media usually attached via PCI Express (PCIe) bus.

In the storage subsystems of IBM® DS8000® series, IBM Storwize®, and IBM FlashSystem, the SAS protocol is used for the internal disks. The storage subsystems have controllers that provide the required hardware adapters for host connectivity to the subsystem. RAID adapters are used to create a virtual disk or logical unit number (LUN) that is configured in one of the supported RAID levels with multiple SAS hard disks based on the level of RAID used. Various levels of RAID of available to configure internal SAS HDDs or SDDs. IBM, DS8000, Storwize, FlashCopy are trademarks of International Business Machines Corporation, registered in many jurisdictions worldwide.

Embodiments of the present invention apply to advanced copy function technologies, for example, point-in-time copy functions to create snapshot and clone copies, and to deduplication technologies. An example of a point-in-time offering is IBM Flashcopy®.

Embodiments will be described in terms of block storage technology, but are equally applicable to other technologies such as file storage technology.

Figure 4:
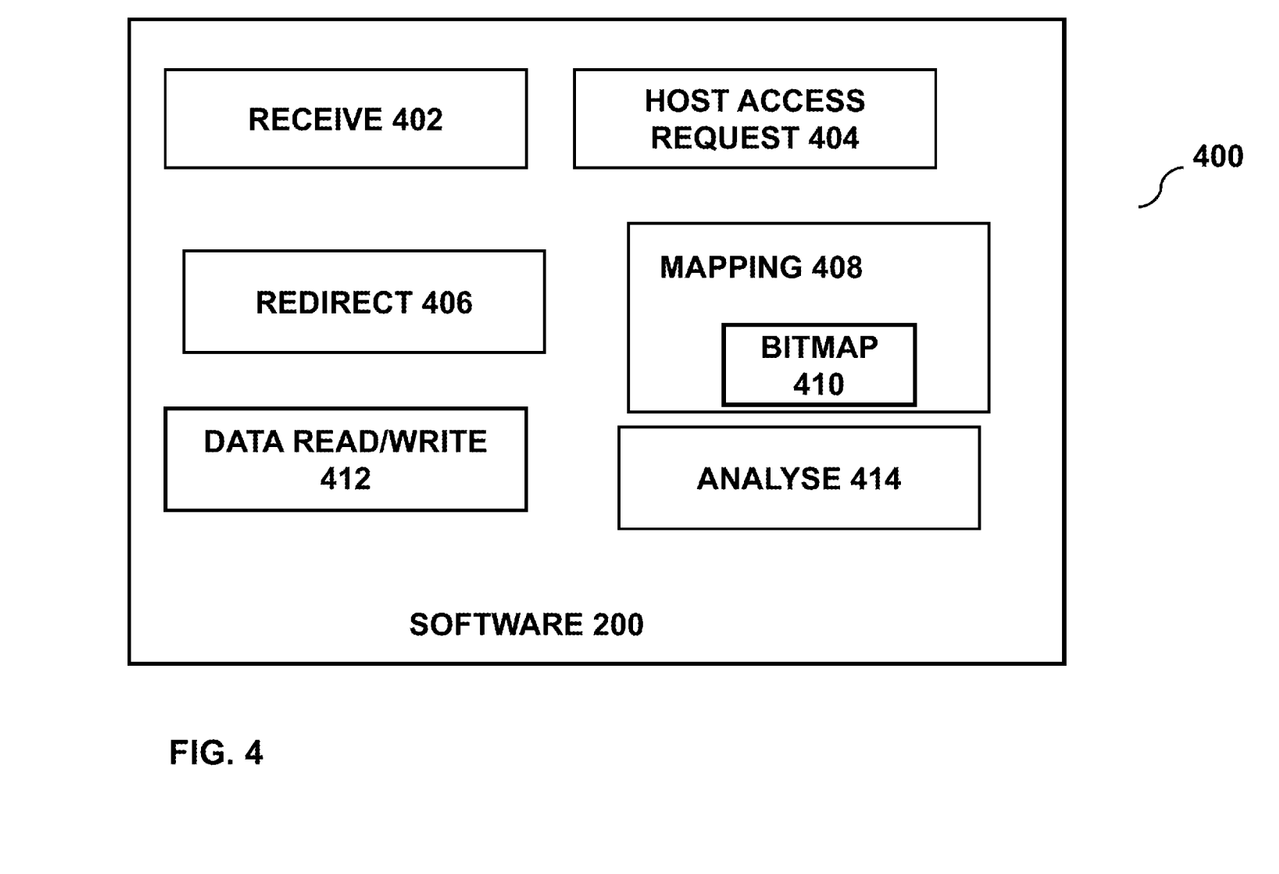
FIG. 4 depicts an exemplary schematic diagram 400 of software elements, according to a preferred embodiment of the present invention.

Point-in-time relies on a bitmap 410 to indicate which grain of data is common between a set of volumes sharing a common ancestor. Deduplication allows a set of unrelated volumes to share a single copy of a grain by allowing references to the original source of the data grain. In both of these cases, it is obvious, that the source of access is not always the same as the entity that holds the data. Therefore, access frequency patterns based on the source of the data are not the same as the source of the access.

The method proposed by this invention is useful in a single source multiple copy environment and is designed to integrate the source access statistics with the ARC (Adaptive Replacement Cache) frequency. When a volume in a flash copy relationship is accessed, the copy services determines if the data is located on the source or the target based on the bitmap. When it diverts the read to a volume different from the originating volume it should notify the cache layer about the identity of the originating volume, the cache then use that information to create more detailed statistics on the real access frequency for data that does not necessarily live within the same volume. When a write occurs and results in a split grain, the cache gets notified and the copy operation migrates the frequencies that correspond to the correct access chain.

Figure 5:
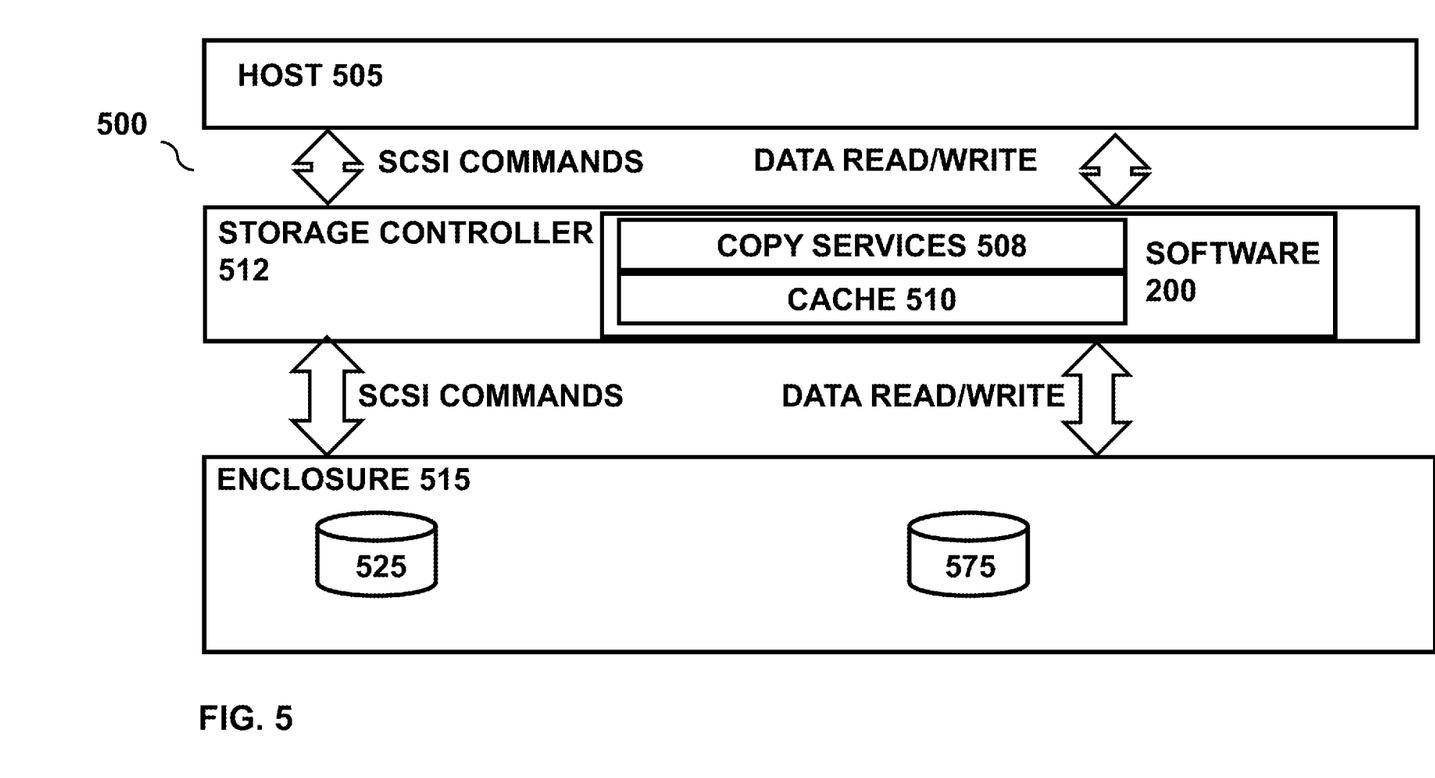
FIG. 5 depicts a high-level exemplary schematic diagram 500 depicting a computer system, according to a preferred embodiment of the present invention.

In an embodiment, the method integrates access statistics with the Adaptive Replacement Cache (ARC) frequency. When a storage volume in a point-in-time relationship is accessed, a copy services component 508 determines if the data is located on the source storage device 525 or the target storage device 575 based on the bitmap 410. When the copy services component 508 diverts a read to a volume different from the volume originally requested by the host 505, the cache 510 is informed about the identity of the originally requested volume. The cache 510 then uses such information to create more detailed statistics on the real access frequency for data that does not necessarily live within the same volume. When a write occurs and results in a split grain, the cache also gets notified and a Copy on Write operation identifies the access frequencies that correspond to the correct access chain for the cache lists.

Embodiments of the invention are described based on Point-in-Time (FlashCopy) technologies, and on deduplication technologies. The skilled person would also understand that embodiments could also apply for any other technologies where there are levels of redirection, for example in a mirroring RAID array where a read of a storage volume may be made from either, or both of any underlying storage devices 525, 575.

Figure 2:
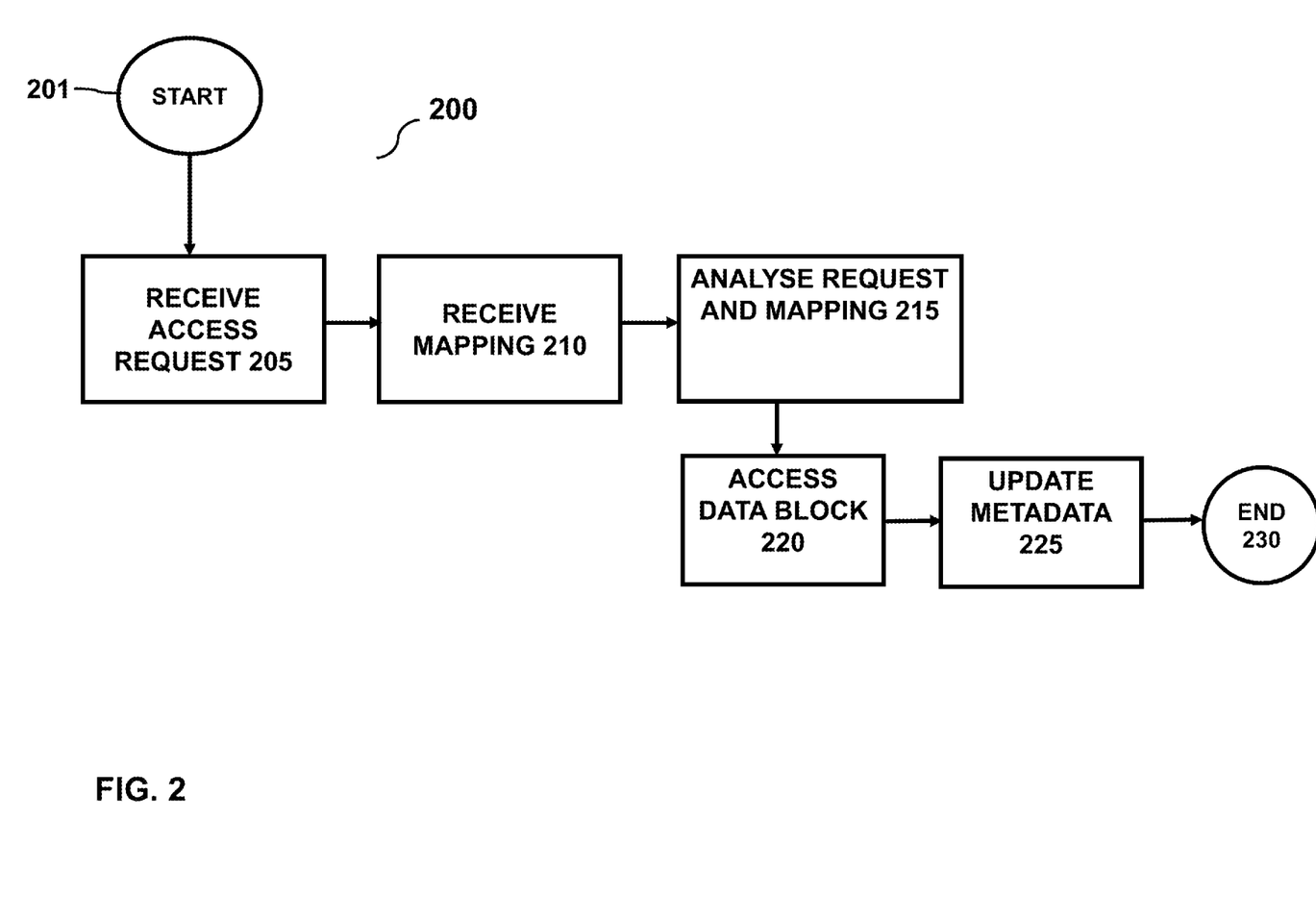
FIG. 2 depicts a high-level exemplary schematic flow diagram 200 depicting operation methods steps, according to a preferred embodiment of the present invention.

FIG. 2, which should be read in conjunction with FIGS. 3 to 8, depicts a high-level exemplary schematic flow diagram 200 depicting operation methods steps for updating cache metadata when reading/writing a storage volume in a storage array, according to a preferred embodiment of the present invention.

Figure 3:
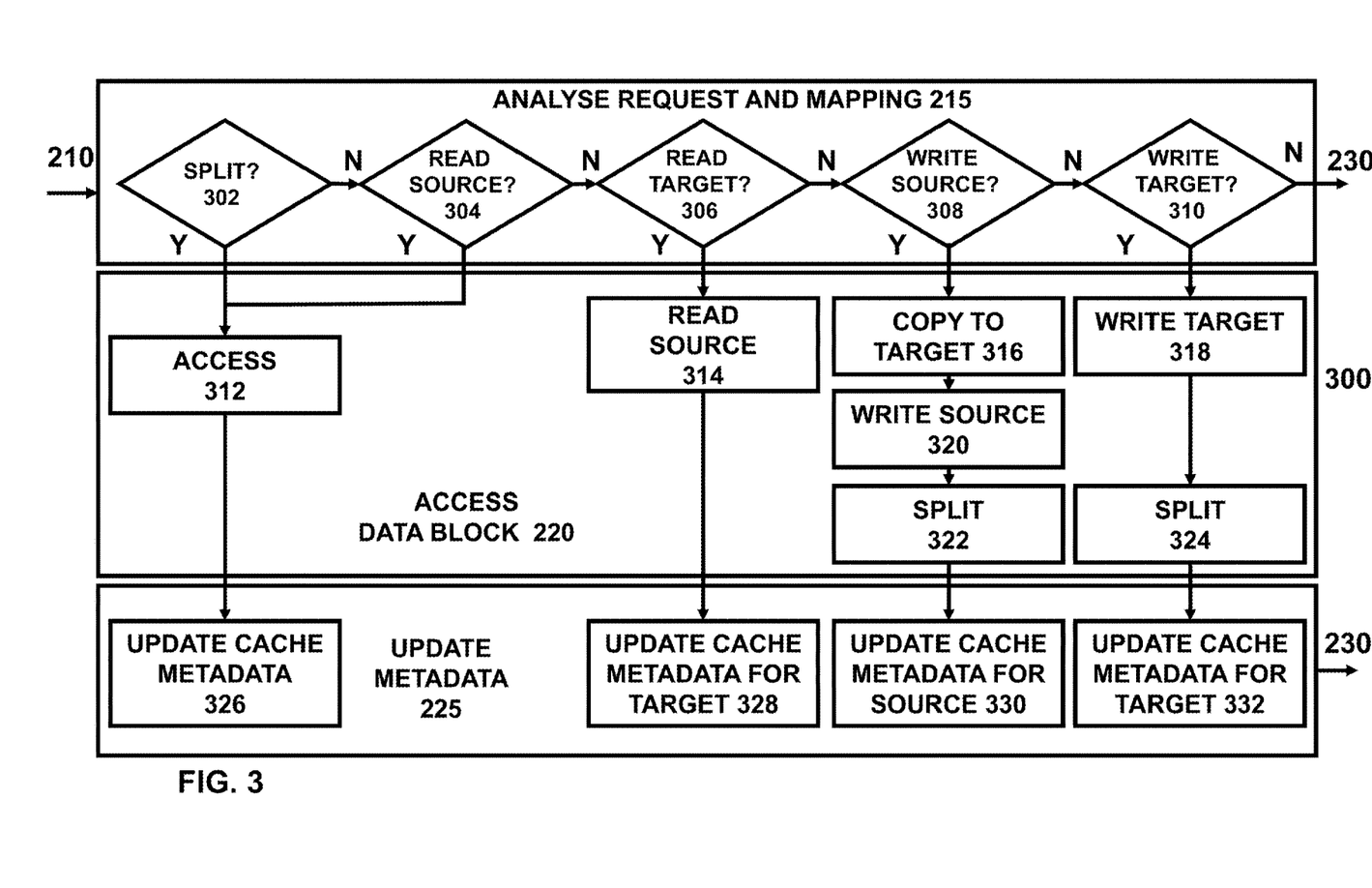
FIG. 3 also depicts an exemplary schematic flow diagram 300 depicting steps of high-level exemplary schematic flow diagram 200, according to a preferred embodiment of the present invention.

FIG. 3 also depicts an exemplary schematic flow diagram 300 depicting steps of high-level exemplary schematic flow diagram 200, according to a preferred embodiment of the present invention.

FIG. 4 depicts an exemplary schematic diagram of software elements, according to a preferred embodiment of the present invention.

FIG. 5 depicts a high-level exemplary schematic diagram 500 depicting a computer system, according to a preferred embodiment of the present invention. FIG. 5 depicts a host 505, a storage controller 512, and a disk enclosure 515. The storage controller 512 also comprises a stack of components, for example a copy services component 508, and a cache component 510. The enclosure 515 comprises the two storage disks 525, 575. Commands are passed between the host 505, storage controller 512 and disk enclosure 515 using SCSI commands. If a cache 510 is available, data is written to the cache 510 and destaged to the disks according to a cache algorithm. For reads, data is first read from the cache 510, and only if not present (known as a cache miss), the data is read from the disks. Data is read and written across the depicted interfaces.

Figure 6:
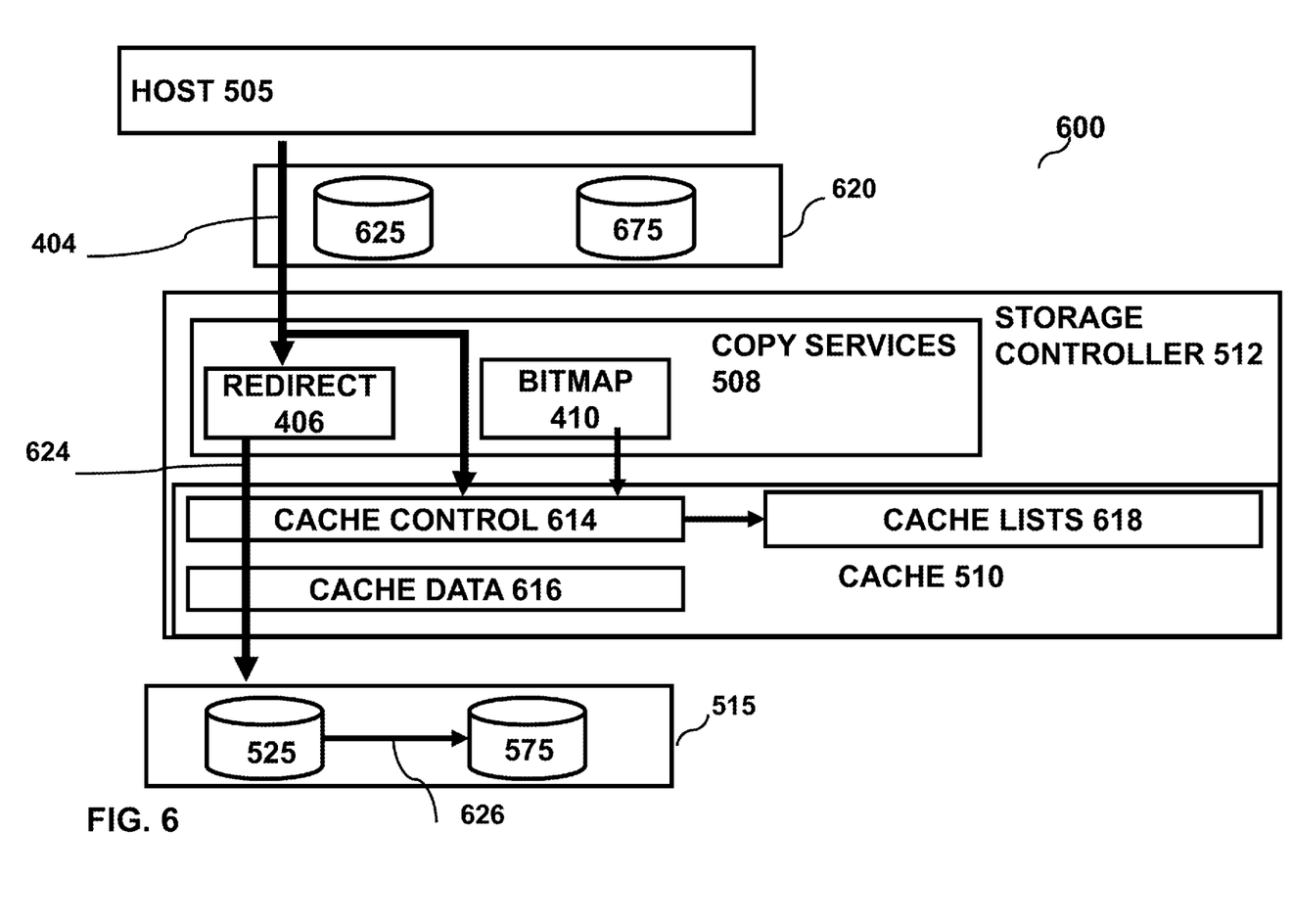
FIG. 6 depicts another high-level exemplary schematic diagram 600 depicting the computer system of FIG. 5, according to a preferred embodiment of the present invention.

FIG. 6 depicts another high-level exemplary schematic diagram 600 depicting the computer system of FIG. 5, according to a preferred embodiment of the present invention.

Figure 7:
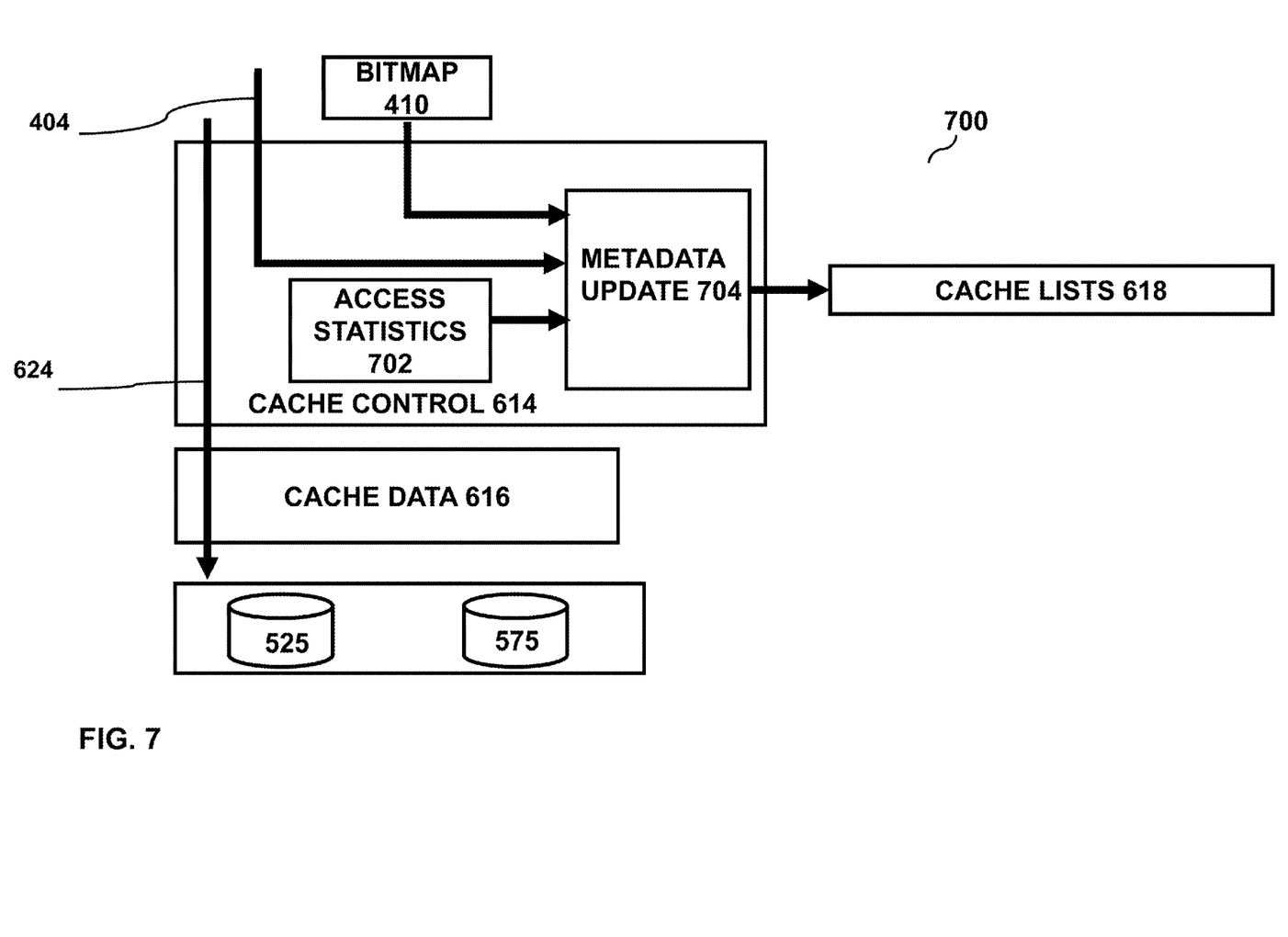
FIG. 7 depicts another high-level exemplary schematic diagram 700 depicting the storage controller of FIG. 6, according to a preferred embodiment of the present invention.

FIG. 7 depicts another high-level exemplary schematic diagram 700 depicting the storage controller of FIG. 6, according to a preferred embodiment of the present invention. Arrow 624 represents an appropriate SCSI command and read/write data flow from the storage controller to the cache control 614, cache data store 616 and to the storage devices 525, 575. The skilled person would understand that in the case of a cache hit, the relevant data would be in the cache 510. The skilled person would also understand that the underlying storage devices 525, 575 could represent logical entities, for example, RAID arrays.

Figure 8:
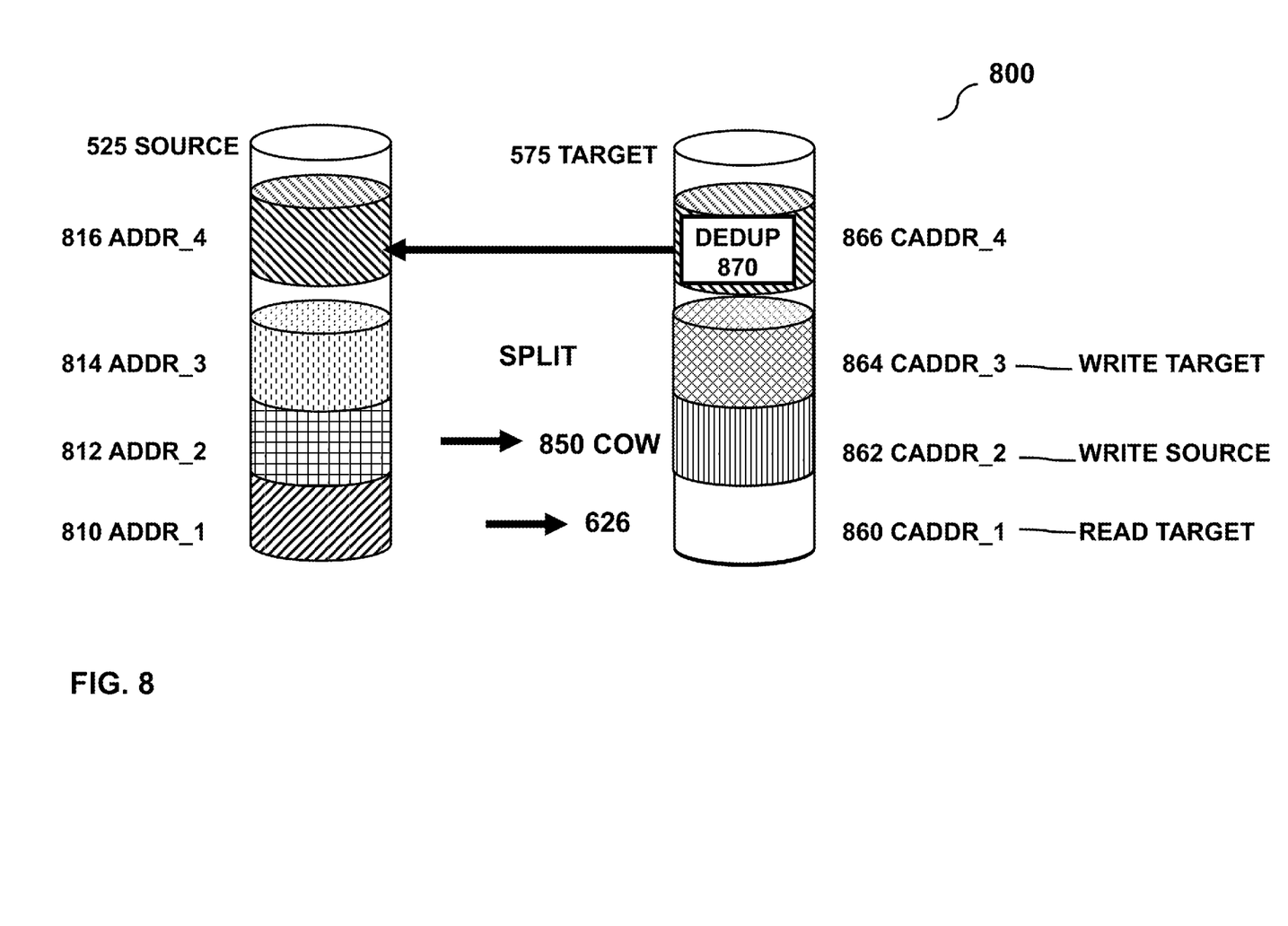
FIG. 8 depicts another high-level exemplary schematic diagram 800 depicting a source storage device and a target storage device, according to a preferred embodiment of the present invention.

FIG. 8 depicts another high-level exemplary schematic diagram 800 depicting a source storage device 525 and a target storage device 575. Source storage device 525 and target storage device 575 are in a copy relationship with each other, according to a preferred embodiment of the present invention. The first data grain at first address ADDR_1 810 is depicted as being different from the data grain at corresponding first address CADDR_1 862. Unless otherwise copied, copying will be carried out in due course by the background copy operation 626. The second data grain at second address ADDR_2 812 and the data grain at corresponding first address CADDR_1 860 are depicted after a Copy on Write operation 850. The third data grain at third address ADDR_3 814 and the data grain at corresponding third address CADDR_3 864 are depicted following a write to the target storage device 575 at that address, and the subsequent split.

Arrows depicted in the Figures represent SCSI command and also read/write data paths.

The method starts at step 201.

In a point-in-time copy relationship between a source storage device 525 and a target storage device 575, at time T=0, the target storage device 575 is instantaneously presented logically as logical target storage device 675 to the host 505 as a full copy of the source storage device 525. The host 505 is presented with a logical view 620 of the underlying storage devices 525, 575. The logical view 620 comprises a logical source storage device 625 corresponding to source storage device 525, and the logical target storage device 675. As part of the copy process a background copy operation 626 is activated to copy each data grain of the source storage device 525 to a corresponding grain on the target storage device 575. A bitmap 410 keeps track of which grains have been copied over to the target storage device 575. Once a data grain has been copied over to the target storage device 575, the bitmap 410 is updated to represent that the data grain is considered as 'split' from the corresponding data grain on the source storage device 525. Once the whole of the data on the source storage device 525 has been copied to the target storage device 575, the target storage device 575 is split from the source storage device 525, and the bitmap 410 can be discarded. The logical target storage device 675 is presented as a full copy at time T=0, because the copy services component 508 redirects reads and writes to the source storage device 525 depending on the contents of the bitmap 410.

At step 205, a receive component 402 receives 205 a host access request 404. A host access request 404 typically comprises a read request from, or a write request to a data block on an underlying storage device resource 525, 575, 510.

At step 210 the receive component 402 receives the mapping 408 between the source storage device 525 and the target storage device 575. An example of a mapping 408 is a bitmap 410. The bitmap 410 typically comprises a table of bits, each representing a grain of data on the source storage device 525. For example, a '1' is used to signify that a grain of data has been copied to the corresponding address on the target storage device 575, and a '0' used to signify that a grain of data has not been copied to the corresponding address on the target storage device 575.

At step 215 an analyse component 414 analyses the host access request 404 and the mapping 408. In response to the host access request 404 and the mapping 408, the analyse component 414 determines which data block to access on the source storage device 525, or on the target storage device 575.

At step 220 a data read/write component 412 accesses the appropriate storage device 525, 575, 510 to perform the host access requested. At step 225 a cache control component 614 determines access statistics 702. A metadata update component 704 uses the host access request 404, the bitmap 410, and the access statistics to determine updates to the cache lists 618. In an ARC cache, the cache lists 618 comprise a recency list and a frequency list. The skilled person would understand that other cache algorithms use different statistics, for example, LRU, LFU, FRU etc. Access statistics may be in the form of heatmaps of cache accesses.

Returning to step 215, FIG. 3 depicts steps within steps 215, 220 and 225.

At step 302 the analyse component 414 analyses the mapping 408 to determine whether the data grain 810, 812, 814, 860, 862, 864 addressed in the host access request 404 has already been copied from the source storage device 525 to the target storage device 575 such that the data grain is split. If the data grain 810, 812, 814, 860, 862, 864 has already split, at step 312, the data read/write component 412 accesses the appropriate storage device 525, 575, 510 to perform the host access requested. At step 326 the metadata update component 704 of the cache control component 614 determines updates to the cache lists 618.

If the data grain 810, 812, 814, 860, 862, 864 has not split, the method 200 passes to step 304. At step 304 the analyse component 414 analyses the mapping 408 to determine whether the host access request 404 is for a read of the source storage device 525. If the host access request 404 is for a read of the source storage device 525, at step 312, the data read/write component 412 accesses the appropriate storage device 525, 575, 510 to perform the host access requested. At step 326 the metadata update component 704 of the cache control component 614 determines updates to the cache lists 618.

At step 304, if the host access request 404 is not for a read of the source storage device 525, the method passes to step 306. At step 306, the analyse component 414 analyses the mapping 408 to determine whether the host access request 404 is for a read of the target storage device 575. If the host access request 404 is for a read of the target storage device 575, the method passes to step 314.

Using an example of a first data grain, the bitmap 410 indicates that a first data grain at a first address ADDR_1 810 on the source storage device 525 has not been copied over to the corresponding first address CADDR_1 860 on the target storage device 575. The redirect component 406 redirects the read host access request 404 for the first data grain from the corresponding first address CADDR_1 860 on the target storage device 675, 575 to a read access request 624 of the first data grain from the first address ADDR_1 810 on the source storage device 525.

At step 328 the cache control component 614 determines access statistics 702 for the read of the first data grain to the target storage device 575. The metadata update component 704 uses the bitmap 410 (to determine copy splits), the host access request 404, and the access statistics to determine contents of the cache lists 618. Although the read access request 624 for the first data grain was directed to the source storage device 525, the read host access request 404 was actually made for the target storage device 575. It is important to reflect this in the cache statistics, otherwise after a split between the source storage device 525 and the target storage device 575, it would appear that the source storage device 525 would have had far more read requests than were made by the host 505. FIG. 7 depicts that the metadata update component 704 uses the bitmap 410 (to determine copy splits), the host access request 404, and the access statistics to determine contents of the cache lists 618.

At step 306, if the host access request 404 is not for a read of the target storage device 575, the method passes to step 308. If the host access request 404 is for a write of the source storage device 525, the method passes to step 316.

Using an example of a second data grain, the bitmap 410 indicates that a second data grain at a second address ADDR_2 812 has not been copied over to the target storage device 575. At step 316 a copy 850 of an existing data grain at the second address ADDR_2 812 on the source storage device 525 is made to a corresponding second address CADDR_2 862 on the target storage device 575.

At step 320, a write of a second data grain to the second address ADDR_2 812 on the source storage device 625, 525 is made, overwriting the existing data grain that has just been copied over to the corresponding second address CADDR_2 862 on the target storage device 575 in step 316. At step 322, the bitmap 410 is updated to reflect a split between the source storage device 525 and the target storage device 575. The copying to the target storage device 575 when a write is made to the source storage device 575 is known as a Copy-on-Write (COW) operation.

At step 330 the cache control component 614 determines access statistics 702 for the write of the second data grain to the source storage device 525. The metadata update component 704 uses the bitmap 410 (to determine copy splits), the host access request 404, and the access statistics to determine contents of the cache lists 618.

At step 308, if the host access request 404 is not for a write of the source storage device 525, the method passes to step 310. If the host access request 404 is for a write of the target storage device 575, the method passes to step 318.

Using an example of a second data grain, the bitmap 410 indicates that a third data grain at a third address ADDR_3 814 on the source storage device 525 has not been copied over to the corresponding third address CADDR_3 864 on the target storage device 575. A fourth data grain is written to a third corresponding address CADDR_3 864 on the target storage device 575. At step 324, the bitmap 410 being updated to reflect that the data grain is split.

At step 332 the cache control component 614 determines access statistics 702 for the write of the third data grain to the target storage device 575. The metadata update component 704 uses the bitmap 410 (to determine copy splits), the host access request 404, and the access statistics to determine contents of the cache lists 618.

At step 310, if the host access request 404 is not for a write of the target storage device 575, the method passes to step 230.

Without the invention, only the source volume has all of the access statistics due to the target reads redirecting to the source volume. When the grains are eventually split, the frequency statistics on the target volume would indicate that the data is 'cold' as it retains none of its previous heat map, when it is in fact 'hot' on the source. The statistics being lost could lead to cache making the wrong decision as to the validity of maintaining this data in cache. Data would be seen as cold and potentially placed onto an LRU rather than promoted and maintained in FRU (for ARC). The flip side is also possible, that the source grain may be perceived as hot while all the heat is generated by access by the copy volume. This could lead to a FRU slot in cache being retained for the source data when it is overwritten, when in fact it is the copy volumes access that needed this heat/FRU slot.

In an alternative embodiment, instead of using Copy on Write, a Redirect on Write (ROW) is used. In ROW The data originally associated with the source storage device 525 stays in place. The new data is written to a different location on the disk. After the write request is completed and acknowledged, the original data is associated with the target storage device 575 and the newly written data is associated with the source storage device 525.

In contrast with COW method, with ROW the actual activity involved in taking the point in time copy reduced.

At step 306, if the host access request 404 is not for a read of the target storage device 575, the method passes to step 308. If the host access request 404 is for a write of the source storage device 525, the method passes to step 316.

Using an example of the second data grain, the bitmap 410 indicates that a second data grain at the second address ADDR_2 812 has not been copied over to the target storage device 575.

At step 320, a write of the second data grain to a further address (not shown) on the source storage device 525 is made. At step 322, the bitmap 410 is updated to reflect a split between the source storage device 525 and the target storage device 575. The redirection to further address on the source storage device 525 is known as the Redirect-on-Write (ROW) operation. Copying of the data to corresponding second address CADDR_2 862 is performed using the background copy operation 626. Pointers need to be updated to ensure that corresponding second address CADDR_2 862 points to second address ADDR_2 812, and not to the further address on source storage device 525 that the new data has been written to.

At step 330 the cache control component 614 determines access statistics 702 for the write of the second data grain to the source storage device 525. The metadata update component 704 uses the bitmap 410 (to determine copy splits), the host access request 404, and the access statistics to determine contents of the cache lists 618.

Embodiments are also applicable if the point-in-time copy comprises a chain of point-in-time copies. In such a chain, a set of target storage devices 575 provide a chain with mappings describing how they correspond with one another, and with a source storage device 525. A read of target storage device N 575 is redirected to, say target storage device N−1 575, and along the chain to the source storage device 525. Reads to target storage device N 575 would provide cache access statistics for target storage device N 575 under this invention.

In another embodiment target storage device 575 contains a storage volume at address CADDR_4 866 that is a copy of a storage volume at address ADDR_4 816 on the source storage device 525. Rather than having duplicate copies of storage volumes, which can take up valuable storage capacity, the storage volume at address CADDR_4 866 can be replaced by a deduplication record 870 which points at address ADDR_4 816. Storage device 575 will be referred to as a "deduplication storage device 575". The skilled person would understand that deduplicate storage volumes may also reside on the same storage device 525, 575, 510. At step 306, the analyse component 414 analyses the mapping 408 to determine whether the host access request 404 is for a read of the deduplication storage device 575. If the host access request 404 is for a read of the deduplication storage device 575, the method passes to step 314.

Using an example of a fourth data grain, the mapping 408 comprising the deduplication record 870 indicates that the fourth data grain at fourth address ADDR_4 816 on the source storage device 525 is a pointed at from corresponding fourth address CADDR_4 866 on the deduplication storage device 575. The redirect component 406 redirects the read host access request 404 for the fourth data grain from the corresponding fourth address CADDR_4 866 on the deduplication storage device 675, 575 to a read access request 624 of the fourth data grain from the fourth ADDR_4 816 on the source storage device 525.

At step 328 the cache control component 614 determines access statistics 702 for the read of the fourth data grain to the deduplication storage device 575. The metadata update component 704 uses the deduplication record 870, the host access request 404, and the access statistics to determine contents of the cache lists 618. Although the read access request 624 for the fourth data grain was directed to the source storage device 525, the read host access request 404 was actually made for the deduplication storage device 575. It is important to reflect this in the cache statistics it would appear that the source storage device 525 would have had far more read requests than were made by the host 505.

In an alternative embodiment, a different interface is used, for example NVMe.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein. It will be readily understood that the components of the application, as generally described and illustrated in the Figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above invention may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

Moreover, the same or similar reference numbers are used throughout the drawings to denote the same or similar features, elements, or structures, and thus, a detailed explanation of the same or similar features, elements, or structures will not be repeated for each of the drawings. The terms "about" or "substantially" as used herein with regard to thicknesses, widths, percentages, ranges, etc., are meant to denote being close or approximate to, but not exactly. For example, the term "about" or "substantially" as used herein implies that a small margin of error is present. Further, the terms "vertical" or "vertical direction" or "vertical height" as used herein denote a Z-direction of the Cartesian coordinates shown in the drawings, and the terms "horizontal," or "horizontal direction," or "lateral direction" as used herein denote an X-direction and/or Y-direction of the Cartesian coordinates shown in the drawings.

Additionally, the term "illustrative" is used herein to mean "serving as an example, instance or illustration." Any embodiment or design described herein is intended to be "illustrative" and is not necessarily to be construed as preferred or advantageous over other embodiments or designs.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For the avoidance of doubt, the term "comprising", as used herein throughout the description and claims is not to be construed as meaning "consisting only of".

What is claimed is:

1. A computer implemented method for managing a storage system, the storage system comprising a first storage device, a second storage device, a source storage device, a target storage device, and a cache, comprising:
    receiving a first host access request for a data block on the first storage device;
    receiving a mapping between the source storage device and the target storage device, wherein the mapping indicates whether the data block is split from the source storage device;
    in response to the first host access request and the mapping:
        perform the first host access request using the source storage device or the target storage device, based on a location of the data block according to the mapping;
        based on the first host access request, the mapping, and access statistics corresponding to the mapping, updating metadata for the cache.

2. The method of claim 1, wherein the mapping indicates that the data block on the first storage device has not been copied to a corresponding data block on the second storage device, further comprising:
    in response to the first host access request comprising a read request for the data block on the target storage device and to the mapping:
        accessing the corresponding data block on the second storage device comprises reading the corresponding data block on the source storage device; and
        updating metadata comprises updating metadata for the target storage device.

3. The method of claim 1, wherein the mapping indicates that the data block on the first storage device has not been copied to a corresponding data block on the second storage device, further comprising:
    in response to the first host access request comprising a write request for the data block on the source storage device and the mapping:
        accessing the corresponding data block on the second storage device comprises writing the data block to the source storage device; and
        updating metadata comprises updating metadata for the source storage device.

4. The method of claim 1, further comprising:
    copying a second data block from the source storage device to a second corresponding data block on the target storage device prior to writing the data block to the source storage device; and
updating metadata further comprises updating the mapping to indicate that the data block on the first storage device has been copied to a corresponding data block on the second storage device.

5. The method of claim 1, wherein:
    the mapping indicates that the data block on the first storage device has not been copied to a corresponding data block on the second storage device, the method further comprising:
    in response to the first host access request comprising a write request for the data block on the target storage device and the mapping:
        accessing the corresponding data block on the second storage device comprises writing the data block on the target storage device;
        and writing the data block to the source storage device; and updating metadata comprises updating metadata for the source storage device and updating the mapping to indicate that the data block on the first storage device has been copied to a corresponding data block on the second storage device.

6. The method of claim 1, wherein the target storage device comprises a point in time copy of the source storage device.

7. The method of claim 1, wherein the target storage device comprises a deduplication record of the source storage device.

8. The method of claim 1, wherein the source storage device and the target storage device are members of a mirroring RAID array.

9. A computer system for managing a storage array in a storage system, the storage system comprising a first storage device, a second storage device, a source storage device, a target storage device, and a cache, the system comprising:
one or more processors;
a memory coupled to at least one of the processors; and
a set of computer program instructions stored in the memory and executed by at least one of the processors in order to perform actions of:
receiving a first host access request for a data block on the first storage device;
receiving a mapping between the source storage device and the target storage device, wherein the mapping indicates whether the data block is split from the source storage device;
in response to the first host access request and the mapping:
perform the first host access request using the source storage device or the target storage device, based on a location of the data block according to the mapping; and
based on the first host access request, the mapping, and access statistics corresponding to the mapping, updating metadata for the cache.

10. The computer system of claim 9, wherein the mapping indicates that the data block on the first storage device has not been copied to a corresponding data block on the second storage device, comprising:
responsive to the first host access request comprising a read request for the data block on the target storage device and to the mapping:
reading the corresponding data block on the source storage device; and
updating metadata for the target storage device.

11. The computer system of claim 9, wherein the mapping indicates that the data block on the first storage device has not been copied to a corresponding data block on the second storage device, further comprising:
responsive to the first host access request comprising a write request for the data block on the source storage device and the mapping:
writing the data block to the source storage device; and
updating metadata for the source storage device.

12. The computer system of claim 9, further comprising:
copying a second data block from the source storage device to a second corresponding data block on the target storage device prior to writing the data block to the source storage device; and
updating the mapping to indicate that the data block on the first storage device has been copied to a corresponding data block on the second storage device.

13. The computer system of claim 9, wherein the mapping indicates that the data block on the first storage device has not been copied to a corresponding data block on the second storage device, the system further comprising:
responsive to the first host access request comprising a write request for the data block on the source storage device and the mapping:
copying a second data block from the source storage device to a second corresponding data block on the target storage device; and writing the data block to the source storage device; and
the metadata update component further operable for metadata for the source storage device and the mapping component for updating the mapping to indicate that the data block on the first storage device has been copied to a corresponding data block on the second storage device.

14. The computer system of claim 9, wherein the mapping indicates that the data block on the first storage device has not been copied to a corresponding data block on the second storage device, the system further comprising:
responsive to the first host access request comprising a write request for the data block on the target storage device and the mapping:
the read/write component further operable for writing the data block on the target storage device;
and writing the data block to the source storage device; and
the metadata update component for updating metadata for the source storage device and the mapping component for updating the mapping to indicate that the data block on the first storage device has been copied to a corresponding data block on the second storage device.

15. The computer system of claim 9, wherein the target storage device comprises a point in time copy of the source storage device.

16. The computer system of claim 9, wherein the target storage device comprises a deduplication record of the source storage device.

17. The computer system of claim 9, wherein the source storage device and the target storage device are members of a mirroring RAID array.

18. A computer program product for managing a storage array in a storage system, the computer program product comprising: a non-transitory tangible storage device having program code embodied therewith, the program code executable by a processor of a computer to perform a method, the method comprising:
receiving a first host access request for a data block on the first storage device;
receiving a mapping between the source storage device and the target storage device, wherein the mapping indicates whether the data block is split from the source storage device;
in response to the first host access request and the mapping:
perform the first host access request using the source storage device or the target storage device, based on a location of the data block according to the mapping; and
based on the first host access request, the mapping, and access statistics corresponding to the mapping, updating metadata for the cache.

19. The computer program product of claim 18, wherein the mapping indicates that the data block on the first storage device has not been copied to a corresponding data block on the second storage device, further comprising:
  in response to the first host access request comprising a read request for the data block on the target storage device and to the mapping:
    accessing the corresponding data block on the second storage device comprises reading the corresponding data block on the source storage device; and
    updating metadata comprises updating metadata for the target storage device.

20. The computer program product of claim 18, wherein the mapping indicates that the data block on the first storage device has not been copied to a corresponding data block on the second storage device, further comprising:
  in response to the first host access request comprising a write request for the data block on the source storage device and the mapping:
    accessing the corresponding data block on the second storage device comprises writing the data block to the source storage device; and
    updating metadata comprises updating metadata for the source storage device.

\* \* \* \* \*